United States Patent
McGowan et al.

(10) Patent No.: US 6,731,953 B1
(45) Date of Patent: May 4, 2004

(54) APPARATUS AND METHOD FOR ASYMMETRICAL FREQUENCY SPECTRUM UTILIZATION IN A WIRELESS NETWORK

(75) Inventors: Neil McGowan, Stittsville (CA); Andrew McGregor, Kanata (CA); Jose M. Costa, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 547 days.

(21) Appl. No.: 09/606,690

(22) Filed: Jun. 30, 2000

(51) Int. Cl.[7] .............................. H04Q 7/32; H04Q 7/30; H04Q 7/20
(52) U.S. Cl. ............... 455/561; 455/562.1; 455/550.1; 455/552.1; 455/553.1; 455/517; 370/310; 370/343
(58) Field of Search .......................... 455/561, 562, 455/550, 303, 314, 552, 553, 266, 422, 517, 403, 552.1, 553.1, 562.1, 422.1, 426.1, 445, 88, 550.1, 575.7; 370/478, 310, 343, 441, 442

(56) References Cited

U.S. PATENT DOCUMENTS

| | | | | |
|---|---|---|---|---|
| 5,758,294 A | * | 5/1998 | Ganesan et al. ............ | 455/561 |
| 5,790,959 A | * | 8/1998 | Scherer ...................... | 455/561 |
| 6,178,329 B1 | * | 1/2001 | Chao et al. ................. | 455/561 |
| 6,256,511 B1 | * | 7/2001 | Brown et al. ............ | 455/552.1 |
| 6,363,262 B1 | * | 3/2002 | McNicol ..................... | 455/561 |
| 6,415,162 B1 | * | 7/2002 | Dent .......................... | 455/562 |
| 6,487,219 B1 | * | 11/2002 | Snider ........................ | 455/552 |
| 2001/0041584 A1 | * | 11/2001 | Watanabe ................... | 455/552 |

* cited by examiner

*Primary Examiner*—William Trost
*Assistant Examiner*—Keith Ferguson

(57) ABSTRACT

Implementing asymmetrical wireless communications without significant wastage of bandwidth within the up-link block of frequency spectrum is becoming increasingly important. If the frequency spectrum is divided such that a single up-link block is paired with a plurality of corresponding down-link blocks of similar bandwidth size and respective fixed frequency offsets, the bandwidth efficiency of spectrum usage can improve when considering many data applications such as the Internet. MTs that utilize different down-link blocks can share a common up-link block so that, in ideal statistical situations, the up-link block statistically runs out of bandwidth at approximately the same time as the combination of the down-link blocks. With fixed frequency offsets between the up-link block and each of the plurality of down-link blocks, the design of the STS and the MTs can be kept reasonably simple.

40 Claims, 11 Drawing Sheets

APPARATUS AND METHOD FOR ASYMMETRICAL FREQUENCY SPECTRUM UTILIZATION IN A WIRELESS NETWORK

FIELD OF THE INVENTION

This invention relates generally to wireless networks and, in particular, to apparatus and methods for asymmetrical frequency spectrum utilization in a wireless network.

BACKGROUND OF THE INVENTION

A standard allocation of frequency spectrum for use in a wireless network is illustrated in FIG. 1A. In this case, there is a first block of frequency spectrum, labelled A within FIG. 1A, which is used for up-link traffic while there is a second block of frequency spectrum, labelled B within FIG. 1A, which is used for down-link traffic. As defined herein, up-link traffic includes all communications from Mobile Terminals (MTS) to Base Transceiver Stations (BTSs) and down-link traffic includes all communications from the BTSs to the MTs. Further, as illustrated within FIG. 1A, there is typically a Frequency Gap (F.G.) between the up-link and down-link blocks of spectrum for separation purposes. One example of frequency spectrum allocation such as that illustrated in FIG. 1A is the implementation of the cellular communications band in North America. In this case, as labelled on FIG. 1A, up-link traffic is assigned the block of frequencies between 824 and 849 MHz and down-link traffic is assigned the block of frequencies between 869 and 894 MHz, thus maintaining a frequency separation of exactly 45 MHz between up-link and down-link channels.

With the use of the frequency spectrum allocation of FIG. 1A, companies purchase licenses for sub-blocks of spectrum within the A and B blocks, each sub-block comprising a plurality of Radio Frequency (RF) channels. For each company that purchases a license, their sub-block within the A block (the A sub-block) and their sub-block within the B block (the B sub-block) are located at relatively the same positions within their respective blocks. Thus, each of the Radio Frequency (RF) channels within the A sub-block has a corresponding RF channel within the B sub-block at a fixed frequency offset, the fixed 45 MHz frequency offset being the same for all of the RF channels within all of the sub-blocks. The fixed frequency offset allows for a single oscillator to be implemented within each MT for both the up-link and down-link communications. If there was a variable frequency offset, an oscillator would have to be implemented for each possible offset, thus increasing costs and power consumption for the MT considerably.

Individual users of the wireless network must setup an account with one of the companies licensing sub-blocks of the frequency spectrum in order to have their MTs be assigned to RF channels within the up-link and down-link sub-blocks. Since not all users require bandwidth at all times, a system design is performed by each company that owns a frequency spectrum license to determine the number of users that it can assign to a particular set of RF channels without causing excessive amounts of blocked voice calls due to a lack of bandwidth. This system design balances revenue for the company versus caller satisfaction.

Companies holding cellular licenses may also hold licenses within the Personal Communications System (PCS) band located between 1850 and 1990 MHz (1850 to 1910 MHz for up-link communications, 1930 to 1990 MHz for down-link communications and 1910 to 1930 MHz for a guard band). In this case, users could purchase a uni-band MT that allows access to one of the two bands or a dual-band MT that allows access to both of the bands available from the particular company, the dual-band MT requiring two oscillators and two sets of tuned bandpass filters. FIG. 1B illustrates the situation in which there is a plurality of frequency bands available for use by the MTs, particularly the cellular band and the PCS band. In this case, there are the A and B blocks as described above with reference to FIG. 1A along with an additional frequency band comprising an up-link block labelled X and a down-link block labelled Y.

With the use of the frequency spectrum allocation as illustrated in any one of FIGS. 1A and 1B, there is a symmetrical allocation of frequency bandwidth for the up-link and down-link communications. This works well for voice communications that generally are full-duplex and symmetrical.

Unfortunately, data communications do not generally operate symmetrically. With numerous data communication applications, there is considerably more down-link data traffic than up-link traffic. For instance, a single short request from a MT connected to the Internet could result in the downloading of a considerable amount of data information. When compared to a typical voice session which might require 10 kbps within both the up-link and down-link blocks, a data session might typically require only 1 kbps in the up-link block and 100 kbps in the down-link block for efficient communications.

The result of this asymmetrical use of the up-link and down-link blocks is that the resources of the down-link block are being consumed much quicker than the resources of the up-link block. Thus, considerable bandwidth will be wasted within the up-link block, or the amount of bandwidth allocated to each user for down-link communications will be significantly limited, likely causing dissatisfaction with users.

Therefore, a new allocation method of frequency spectrum is required that complements the asymmetrical frequency usage caused by data communications. This new system will preferably allow for fixed offsets to be maintained between the paired up-link and down-link traffic, thus allowing for relatively simple and cheap MT implementations, while also allowing for additional bandwidth to be assessable for bandwidth hungry down-link communications.

SUMMARY OF THE INVENTION

The present invention is directed to apparatus and methods for implementing asymmetrical wireless communications without significant wastage of bandwidth within the up-link block of frequency spectrum. In embodiments of the present invention, the frequency spectrum is divided such that a single up-link block is paired with a plurality of corresponding down-link blocks of similar bandwidth size and respective fixed frequency offsets. In wireless networks of the present invention, MTs that utilize different down-link blocks share a common up-link block so that, in ideal statistical situations, the up-link block statistically runs out of bandwidth at approximately the same time as the combination of the down-link blocks.

The present invention, according to a first broad aspect, is a Base Transceiver Station (BTS) arranged to be implemented within a wireless network. The BTS includes one or more antennas; at least one receive apparatus coupled to the one or more antennas and first and second transmit apparatus each coupled to the one or more antennas. The receive apparatus operates to receive up-link signals from a plurality of mobile terminals within the wireless network via a channel within a first frequency block. The first transmit apparatus operates to transmit down-link signals to a first set of the plurality of mobile terminals via a channel within a second frequency block. The second transmit apparatus operates to transmit down-link signals to a second set of the plurality of mobile terminals via a channel within a third frequency block.

In preferred embodiments, the channels within the first and second frequency blocks have a first predetermined frequency offset and the channels within the first and third frequency blocks have a second predetermined frequency offset In one embodiment, this first predetermined frequency offset is set by the relative frequency tuning between first and second narrow-band BPFs within the receive and first transmit apparatus respectively while the second predetermined frequency offset is set by the relative frequency tuning between first and third narrow-band BPFs within the receive and second transmit apparatus respectively.

In another embodiment, the first predetermined frequency offset is set by a relative frequency difference between first and second reference oscillation signals input to the receive and first transmit apparatus respectively while the second predetermined frequency offset is set by a relative frequency difference between first and third reference oscillation signals input to the receive and second transmit apparatus respectively.

According to a second broad aspect, the present invention is a wireless network including a plurality of mobile stations and a Base Station Transceiver (BTS). The BTS operates to: receive up-link signals from each of the mobile terminals via a channel within a first frequency block, transmit down-link signals to a first set of the plurality of mobile terminals via a channel within a second frequency block and transmit down-link signals to a second set of the plurality of mobile terminals via a channel within a third frequency block According to a third broad aspect, the present invention is a method for utilizing frequency spectrum within a wireless network. First, the method includes receiving up-link signals from each of a plurality of mobile terminals via a channel within a first frequency block. Next, the method includes transmitting down-link signals to a first set of the plurality of mobile terminals via a channel within a second frequency block and transmitting down-link signals to a second set of the plurality of mobile terminals via a channel within a third frequency block.

The present invention, according to a fourth broad aspect, is a mobile terminal arranged to be implemented within a wireless network. The mobile terminal includes an antenna, a transmit apparatus coupled to the antenna and a plurality of receive apparatus that are each coupled to the antenna. The transmit apparatus operates to transmit up-link signals to a Base Transceiver Station (BTS) within the wireless network via a channel within a first frequency block. The plurality of receive apparatus operate to receive down-link signals from the BTS via channels within a plurality of other corresponding frequency blocks.

In a further aspect, the present invention is a Base Transceiver Station (BTS) arranged to be implemented within a wireless network. The BTS including means for receiving up-link signals from a plurality of mobile terminals within the wireless network via a channel within a first frequency block; and means for transmitting down-link signals to a first set of the plurality of mobile terminals via a channel within a second frequency block and transmitting down-link signals to a second set of the plurality of mobile terminals via a channel within a third frequency block.

In yet a further aspect, the present invention is a mobile terminal arranged to be implemented within a wireless network. The mobile terminal including means for transmitting up-link signals to a Base Transceiver Station (BTS) within the wireless network via a channel within a first frequency block; and means for receiving down-link signals from the BTS via channels within a plurality of other corresponding frequency blocks.

The present invention, according to a fifth broad aspect, is a Base Transceiver Station (BTS) arranged to be implemented within a wireless network. The BTS includes one or more antennas, at least one receive apparatus coupled to the one or more antennas and at least one transmit apparatus also coupled to the one or more antennas. The receive apparatus operates to receive up-link signals from a plurality of mobile terminals within the wireless network via a channel within a first frequency block while the transmit apparatus operates to transmit down-link signals to a first set of the plurality of mobile terminals via a channel within a second frequency block. In this aspect, the frequency offset between the channels within the first and second frequency blocks is dynamically controlled.

According to another aspect, the present invention is similar to that of the fifth broad aspect, but is directed to a mobile terminal with an antenna, transmit apparatus and receive apparatus, the transmit and receive apparatus being similar to those within the fifth broad aspect.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The embodiments of the present invention are described with reference to the following figures, in which.

DETAILED DESCRIPTION OF THE PREFERRED EMBODIMENT

Figure 1A:
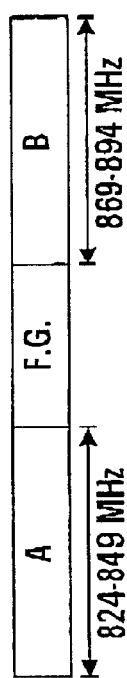
FIGS. 1A and 1B are graphical illustrations of well-known symmetrical frequency spectrum allocation schemes.

The present invention is directed to apparatus and methods for using frequency spectrum within a wireless network asymmetrically between up-link and down-link communications. In embodiments of the present invention, a single up-link block of frequency spectrum corresponds to a plurality of down-link blocks. Therefore, for each RF channel within the up-link block, there are a plurality of corresponding RF channels for down-link communications, one at a corresponding point in each of the plurality of down-link blocks. As will be described herein below in detail, with the use of the present invention, a MT can be assigned significantly different bandwidths with respect to up-link and down-link communications. Thus, within a data or multimedia session in which the down-link communications normally have considerably higher bandwidth needs, the up-link traffic can be assigned a small bandwidth (for example 1 kbps) while the down-link traffic can be assigned a relatively large bandwidth (for example 100 kbps).

Prior to describing the present invention in detail, well-known BTS and MT are now described with reference to FIGS. 2 and 3 respectively. FIG. 2 depicts a block diagram of a well-known BTS implemented within a wireless network with the frequency spectrum allocation scheme of FIG. 1A. In this figure, the ST3 comprises a first receive path including a first antenna 20 coupled in series with a first wide-band BPF 22, a first down-converter 24, a first narrow-band BPF 26 and a first Analog-to-Digital Converter (ADC) 28; a second receive path, used for diversity reception of the same signal, including a second antenna 30 coupled in series with a second wide-band BPF 32, a second down-converter 34, a second narrow-band BPF 36 and a second ADC 38; and a transmit path including a Digital-to-Analog Converter (DAC) 40 coupled in series with a third narrow-band BPF 42, an up-converter 44, a third wide-band BPF 46 and the second antenna 30. Further, as shown in FIG. 2, a Digital Signal Processor (DSP) 50 is independently coupled to the output of the first ADC 28, the output of the second ADC 38 and the input of the DAC 40 while an oscillator 52 is independently coupled to the first down-converter 24, the second down-converter 34 and the up-converter 44.

Figure 2:
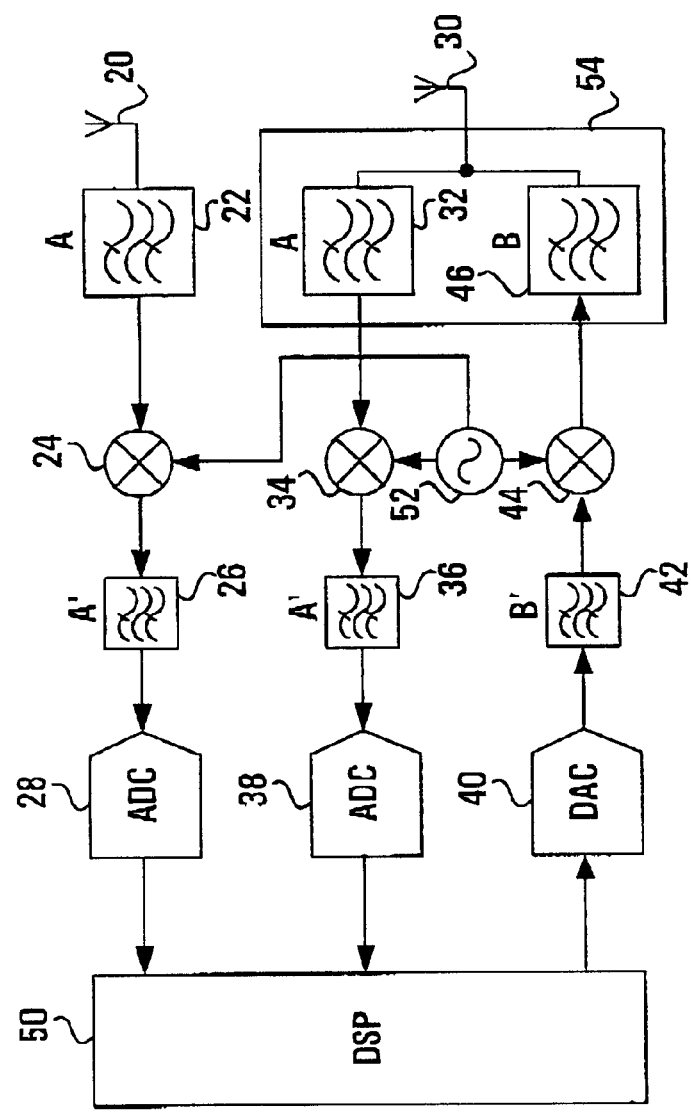
FIG. 2 is a block diagram of a well-known Base Transceiver Station (BTS) implemented within a wireless network with a frequency spectrum allocation scheme of FIG. 1A.

For the receive operation within the STS of FIG. 2, the ETS operates to receive the same radio signals from MTs on both the first and second receive diversity paths, these signals including voice or data information within one of the RF channels of the up-link block (the A block within FIG. 1A). These signals are received at the first and second antennas 22,32 and forwarded to their respective first and second wide-band BPFs 22,32. At the BPFs 22,32, the signals are filtered such that only the signals within the frequencies of the A frequency block or a sub-block of the A block (depending upon the design) are forwarded, the remaining frequencies containing noise or other unwanted signals being removed. Subsequently, the filtered signals are received at the respective down-converters 24,34 and down-converted from Radio Frequency (RF) to either an intermediate frequency or baseband frequency. These down-converted signals are then further filtered by their respective narrow-band filters 26,36 which limit the signals to a particular frequency channel or limited set of frequency channels. Finally, the channel-filtered signals are converted to digital signals by their respective ADCs 28,38. The digital results are output from the ADCs 28,38 and received at the DSP 50 where they are processed. One function that is performed within the DSP 50 is the logical combination of the digital signals to reduce the error rate and improve the signal quality. It should be recognized that in further well-known BTS implementations there could be only a single receive path or alternatively there could be more than two receive paths with separate antennas. Further, the signals from the two receive paths could alternatively be combined using analog techniques rather than being combined within the DSP 50. Yet further, it should also be recognized that the receive paths may contain one or more low-power amplification stages (not shown).

For the transmit operation within the BTS of FIG. 2, the DSP 50 operates to output signals to the transmit path, these signals being digital representations of voice or data information. These digital signals are first sent to the DAC 40 where they are converted to analog signals at a predetermined frequency. Next, the resulting analog signals are filtered by the third narrow-band BPF 42 which limits the signals to a particular frequency channel, removing any noise generated at the DAC 40 on other frequencies. The channel-filtered analog signals are then up-converted to an RF channel within the B block by the up-converter 44 and further filtered by the third wide-band BPF 46 which removes any signals within frequencies outside of the B frequency block or a specified B sub-block (depending upon the design). The resulting signals are subsequently output via the second antenna 30. It should be recognized that the transmit path may contain one or more amplification stages.

It would be understand that the oscillator 52 within the BTS of FIG. 2 provides the reference frequency for the down-conversion and up-conversion operations. In this implementation, the reference frequency can be the same for both the down-conversion and up-conversion operations due to the up-link and down-link frequency spectrum blocks being relatively close in frequency, and the separation being fixed. With these blocks being close, the frequency offset between the A and B blocks can be implemented with the first and second narrow-band BPFs 26,36 being tuned differently than the third narrow-band BPF 42.

Further, it would be understood that the second and third wide-band BPFs 32,46 that are both coupled to the second antenna 30 could be seen as comprising a duplexer 54. In this case, the filters 32,46 essentially operate to split signals traversing the duplexer 54, thus allowing signals on one frequency band (within the A block) to be input and signals on a second frequency band (within the B block) to be output with the use of the single antenna.

It should be recognized that in many BTS designs, the receive antennas and transmit antennas are shared between many independent transceivers and thus, the BPF 46 could be used with other similar BPFs (tuned to other B block frequencies) to combine other independent transmissions which share the same antenna. In this case, BPF 46 could be implemented as a relatively narrow-band filter for combining and a wide-band filter for duplex purposes. Further, it is noted that some implementations may not share a common antenna between transmit and receive paths.

Figure 3:
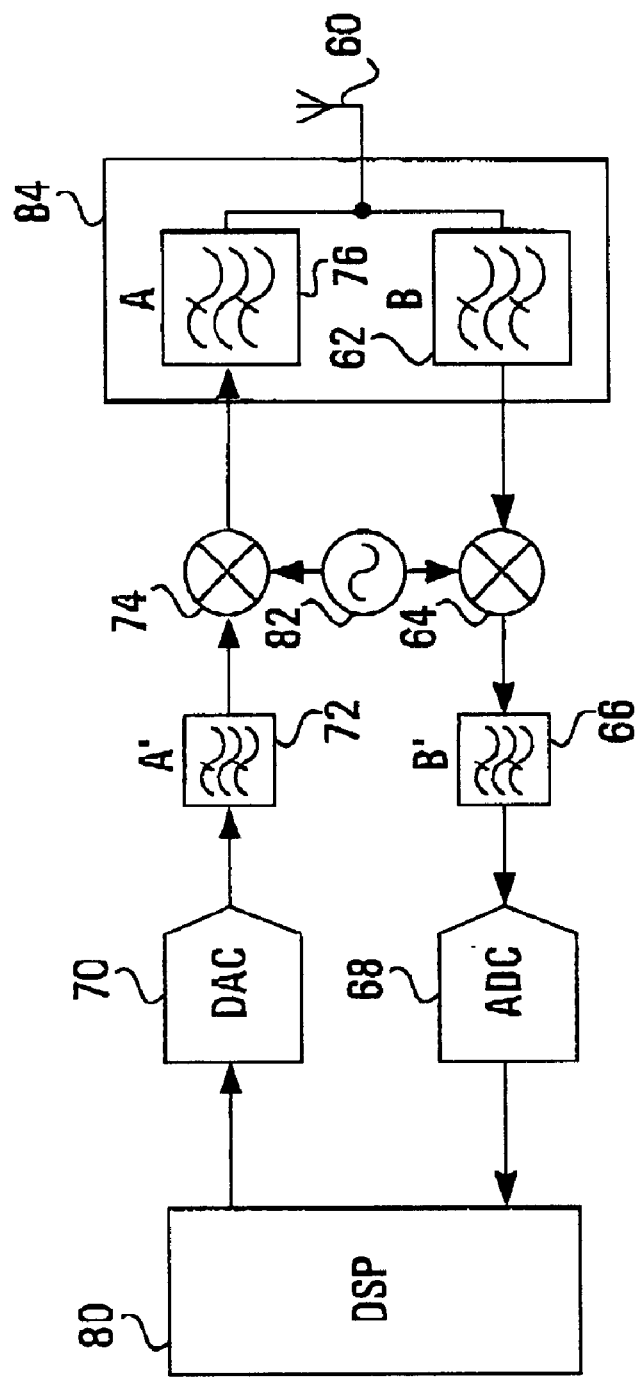
FIG. 3 is a block diagram of a well-known Mobile Terminal (MT) implemented within a wireless network with a frequency spectrum allocation scheme of FIG. 1A.

FIG. 3 is a block diagram of a well-known MT implemented within a wireless network with a frequency spectrum allocation scheme of FIG. 1A. As depicted within FIG. 3, the MT comprises a receive path including an antenna 60 coupled in series with a first wide-band BPF 62, a down-converter 64, a first narrow-band BPF 66 and an ADC 68; and a transmit path including a DAC 70 coupled in series with a second narrow-band BPF 72, an up-converter 74, a second wide-band BPF 76 and the antenna 60. Further, the MT comprises a DSP 80 that is independently coupled to the ADC 68 and the DAC 10 and an oscillator 82 that is coupled to the down-converter 64 and the up-converter 74.

The receive operation within the MT of FIG. 3 is similar to the receive operation described above for the STS of FIG. 2. The MT operates to receive signals from a BTS on its receive path, these signals including voice or data information within one of the RF channels of the down-link block (the B block within FIG. 1A). The processing of these signals after being received occurs in a similar manner to that described for each of the receive paths within the BTS of FIG. 2 but with two main modifications. The first wide-band BPF 62 filters the received signals such that only signals within the frequencies of the B block or a sub-block of the B block (depending upon the design) are forwarded while the first narrow-band filter 66 limits the received signals to a particular frequency channel or limited set of frequency channels that corresponded, prior to being down-converted, to the B frequency block. In essence, the wide-band BPF 62 and the narrow-band BPF 66 would be tuned similarly to the wide-band BPF 46 and the narrow-band BPF 42 respectively of FIG. 2. It is noted that there may not generally be two receive paths within the MT since, for convenience and cost to the user, there is generally only a single antenna.

The transmit operation of the MT within FIG. 3 is also similar to that of the transmit operation described above for the BTS of FIG. 2. The key differences is the frequency band with respect to the filtering that is being performed by the second narrow-band SPF 72 and the second wide-band BPF 76. In the case of the BPF 72, the analog signals output from the DAC 70 are filtered to limit the signals to a particular frequency channel, removing any noise within other frequencies that were generated within the DAC 70. For the case of the BPF 76, the analog signals output from the up-converter 74 are filtered to remove any frequency that is outside of the A block or a specific A sub-block (depending upon the design). In essence, the narrow-band BPF 72 and the wide-band BPF 76 would be tuned similarly to the narrow-band BPFs 26,36 and the wide-band BPFs 22,32 respectively of FIG. 2.

Similar to the oscillator 52 within FIG. 2, it would be understood that the oscillator 82 can provide the reference frequency for the down-conversion and up-conversion operations within the MT of FIG. 3 due to the difference in tuning within the narrow-band BPFs 66,72, this difference in tuning maintaining the frequency offset between the A and B frequency blocks. Further, it would be understood that the first and second wide-band BPFs 62,76 that are both coupled to the antenna 60 can be seen to comprise a duplexer 84. In this case, the filters 62,76 essentially operate to split signals traversing the duplexer 84, thus allowing signals on one frequency band (within the B block) to be input and signals on a second frequency band (within the A block) to be output with the use of the single antenna. Further, the MT may use amplification stages in the receive path and/or the transmit path.

Figure 4:
FIG. 4 is a graphical illustration of a frequency spectrum allocation scheme according to an embodiment of the present invention.

One embodiment of the present invention will now be described with reference to FIGS. 4, 5 and 6. FIG. 4 is a graphical illustration of a frequency spectrum allocation scheme according to an embodiment of the present invention. In this embodiment, there is an up-link block labelled A, a down-link block labelled B and a frequency separation between the A and B blocks similar to the frequency spectrum allocation of FIG. 1A. Further, the frequency spectrum allocation of FIG. 4 comprises a second down-link block labelled block C. As illustrated in FIG. 4, the C block (the second down-link block) is immediately adjacent to the B block (the first down-link block) with no band between them. In alternative embodiments, the C block could be implemented in a band separate from the B block or the C block could occur elsewhere in the frequency spectrum.

Further, although the frequency spectrum allocation of the present invention has been illustrated within FIG. 4 with an up-link block adjacent to two down-link blocks, this should not limit the scope of the present invention. For one, as will be described herein below, the ratio of down-link blocks to up-link blocks could be modified. In many cases in which data traffic is implemented, the ratio should be increased such that there is more down-link blocks per up-link block. In yet further situations that are created in the future, the up-link blocks could outnumber the down-link blocks while still applying the technique of the present invention to accomplish this. Even further, the relative location of the up-link and down-link blocks does not necessarily have to be adjacent. One or more of these blocks could be at different locations within the frequency spectrum, the consequences of which will be described below. (for example, with the frequency offset being large between blocks, additional oscillator(s) within the BTS and at least some of the MTs may be necessary for proper up/down-conversions).

As described above, operators would typically acquire licenses for sub-blocks of the A and B blocks in order to offer wireless services to its customers. The A and B sub-blocks for a particular company would be from a similar relative location within the A and B blocks, so that the relative offset between RF channels within the sub-blocks remains constant. Similar to this, using the frequency spectrum allocation of FIG. 4, it is contemplated that, with the implementation of the present invention, companies would also acquire licenses for sub-blocks of the C block that correspond to their previously licensed A and B sub-blocks. One skilled in the art would understand that this could further apply to situations in which there are further frequency blocks available elsewhere in the frequency spectrum.

Figure 5:
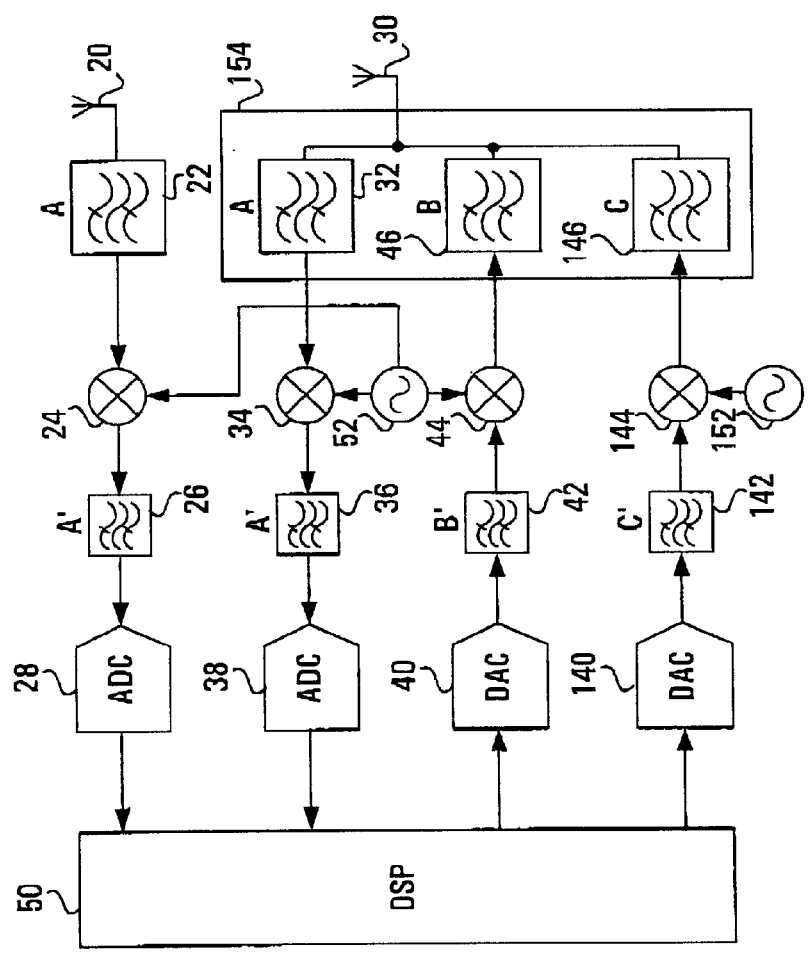
FIG. 5 is a sample block diagram of a BTS according to the present invention implemented within a wireless network with a frequency spectrum allocation scheme of FIG. 4.

FIG. 5 illustrates a sample block diagram of a BTS according to the present invention implemented within a wireless network with a frequency spectrum allocation scheme of FIG. 4. In this case, the BTS is identical to that described above for the well-known BTS of FIG. 2 but with an additional transmit path implemented and modifications within the DSP as will be described herein below. The additional transmit path includes a second DAC 140 coupled in series with a fourth narrow-band BPF 142, a second up-converter 144, a fourth wide-band BPF 146 and the second antenna 30. The inclusion of this second transmit path could make the duplexer 154 as depicted in FIG. 5 also perform combining, although alternatively the fourth wide-band BPF 146 could be independently coupled to a different antenna (not shown) (possibly antenna 20, via a second duplexer).

Further, the BTS of FIG. 5 comprises a second oscillator 152 that is coupled to the second up-converter 144. This second oscillator 152 operates at a modified frequency from that of the first oscillator 52 so that the analog signals output from the narrow-band BPF 142 will be up-converted to the appropriate frequency band for the C block, that being with the appropriate frequency offset with respect to the A and B blocks. This additional transmit path is the same as that previously described above for the BTS of FIG. 2 but with the fourth wide-band BPF 146 being tuned to the C block frequency band and the addition of the second oscillator 152.

In an alternative embodiment, rather than modifying the up-conversion frequency (the oscillator reference frequency) for the additional transmit path, the DSP 50 is modified so that the DAC 140 outputs at a new frequency and a modified narrow-band BPF replaces the BPF 142. In this embodiment, the reference frequency generated from the oscillator 52 could be used within the second up-converter 144 with the new frequency from the narrow-band BPF 142 being tuned such that it maintains the frequency offset between the B and C blocks.

The key advantage of the first described implementation of the STS of FIG. 5 is that the additional transmit path could be implemented as a separate module to a pre-existing product, thus allowing quick integration within pre-existing networks and further allowing for different customers to receive different options. Further, the first described implementation allows for the previously designed narrow-band BPF 42 to be implemented as the narrow-band BPF 142. The key advantage of the alternative embodiment described above is the ability to remove the second oscillator 152, thus reducing cost and space requirements.

An important aspect of this embodiment is that each up-link frequency in the A block is paired with a corresponding down-link frequency in the B block and also with a corresponding down-link frequency in the C block. This could be expanded to further down-link frequency blocks as well. It should be recognized that, although the BTS of FIG. 5 is specific for two transmit paths on two down-link frequency blocks, it should be recognized that further transmit paths could be implemented in a similar manner, thus allowing for wireless networks with greater than two down-link frequency blocks for each up-link frequency block as will be described below.

With the implementation of FIG. 5, the BTS can receive data or voice via RF channels within the A frequency block while it can transmit data or voice via paired RF channels within either the B or C frequency blocks. The decision with respect to which down-link block (B block or C block) to utilize for particular down-link data/voice depends upon the capabilities of the MT that is concerned as will be described herein below with reference to the simplified flow chart of FIG. 7. The MTs communicating with the BTS of FIG. 5 can be grouped into at least two different groups, those that transmit data/voice on RF channels within the A frequency block and receive data/voice on paired RF channels within the B frequency block, similar to the MT illustrated within FIG. 3, and those that transmit data/voice on RF channels within the A frequency block and receive data/voice on paired RF channels within the C frequency block, as will now be described with reference to FIG. 6.

Figure 6:
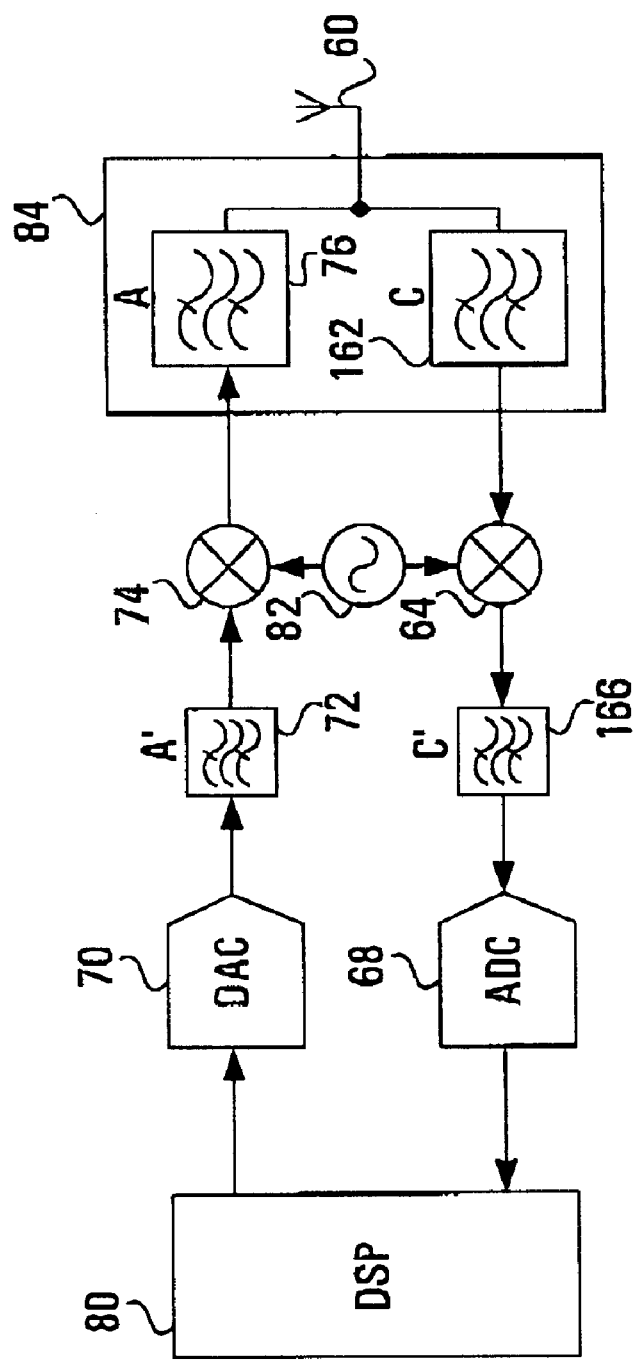
FIG. 6 is a sample block diagram of a MT according to the present invention implemented within a wireless network with a frequency spectrum allocation scheme of FIG. 4.

The MT of FIG. 6 is a slightly modified version of the MT of FIG. 3. The key differences between the MT of FIG. 3 and that of FIG. 6 is the difference within the receive path in terms of the tuning of the BPFs. In the MT of FIG. 6, the wide-band BPF 62 of FIG. 3 is replaced with a wide-band BPF 162 which filters out all noise and signals not within the frequency band of the C block instead of the frequency band of the B block. Further, the narrow-band BPF 66 within FIG. 3 is replaced with a narrow-band BPF 166 which filters the output of the down-converter 64 such that only the selected channel originating from within the C block is forwarded to the ADC 68. The tuning of the narrow-band BPF 166 maintains the appropriate frequency offset between the A and C blocks.

In an alternative embodiment of the MT of FIG. 6, the appropriate frequency offset between the A and C blocks could be maintained with the use of a different oscillator being utilized for the down-conversion operation from the oscillator that is utilized for the up-conversion operation (hence oscillator 62 within FIG. 6 representing two oscillators). In this case, the narrow-band BPF 166 could be the same as the narrow-band BPF 66 of FIG. 3. Further, this would allow for the C frequency block to be significantly displaced from the A frequency block.

In a sample wireless network according to the present invention, various MTs according to FIGS. 3 and 6 are communicating with a STS according to FIG. 5. In this case, an algorithm must be operated within the DSP 50 of the BTS and/or the cellular switching, call handling and control system that communicates with the BTS to determine which transmit path data/voice should be transmitted to any particular MT. A simplified algorithm that could be utilized in the DSP 50 is now described with reference to FIG. 7.

Figure 7:
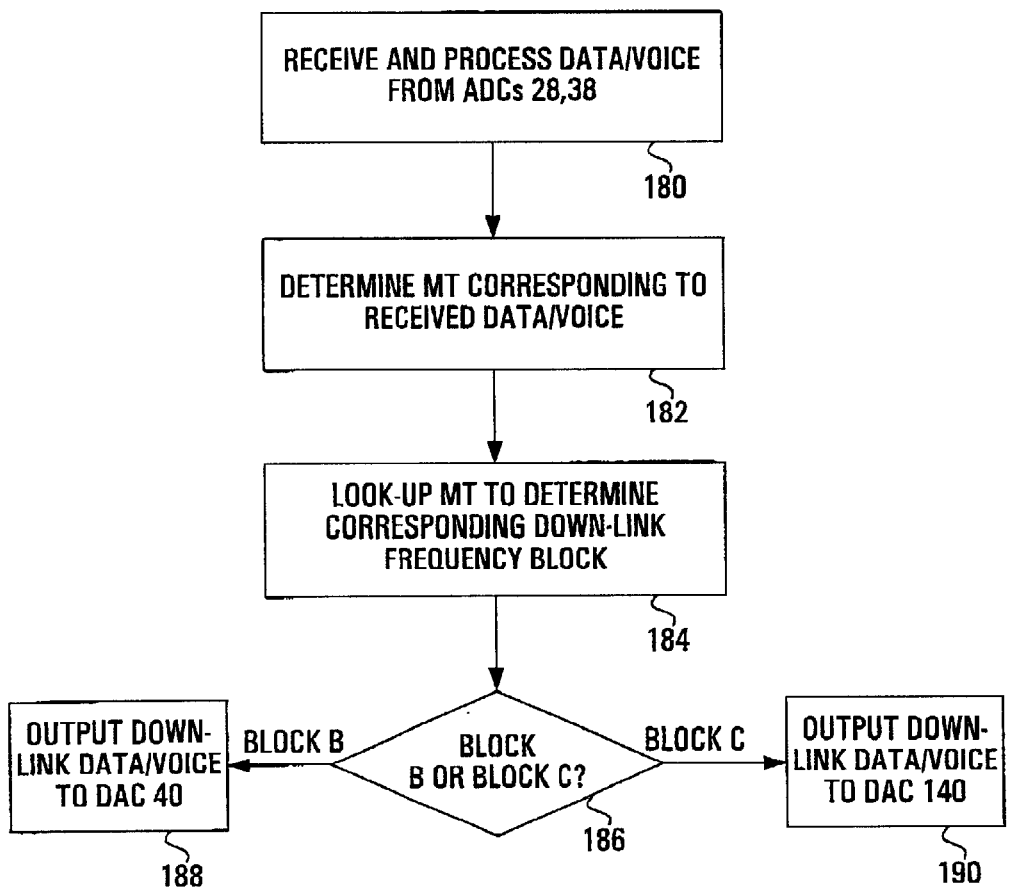
FIG. 7 is a simplified flow chart illustrating a sample set of steps performed by the DSP within the BTS of FIG. 5.

Firstly, within the algorithm of FIG. 7, the BTS DSP 50 and attached cellular switching, call handling and control system receives and processes data/voice signals from the ADCs 28,38 as depicted at step 180. This processing, as described above, preferably includes logically combining the signals received from the two receive paths in order to improve the signal quality and processing for the particular format (CDMA, TDMA, etc.) that the signals relate. Of course, if there were only one receive path, this logical combining would not be necessary. Further, the processing includes determining where to forward the data/voice signals. If the received signals comprise an Internet request packet, this data could be routed to an Internet server for processing and result in large quantities of data information being returned for subsequent transmitting to the particular MT.

Next, the DSP 50 and attached cellular switching, call handling and control system determines at step 182 which MT corresponds to the received data/voice signals. This determination can be achieved with well-known wireless BTS algorithms. With this determination, at step 184, the DSP 50 within the BTS of FIG. 5 checks the frequency capabilities of the determined MT to determine its corresponding down-link frequency block (in the case of the BTS of FIG. 5, the down-link frequency block being one of the B or C frequency blocks). This look-up is preferably performed with an internal database that is updated during initial handshaking between the MT and the BTS, the MT transmitting information indicating its down-link frequency block during this handshaking procedure.

Finally, as depicted at step 186, based upon the look-up at step 184, there is a determination to send data via RF channels within the B frequency block or the C frequency block. If the data/voice signals are to be sent via the B frequency block, the digital signals are output from the DSP 50 to the DAC 40 while, if the data/voice signals are to be sent via the C frequency block, the digital signals are output from the DSP 50 to the DAC 140.

The embodiment of the present invention described above is specific to a network in which MTs could utilize the A frequency block for up-link communications and one of the B or C frequency blocks for down-link communications, these MTs being referred to hereinafter as uni-band MTs. This should not limit the scope of the present invention. In alternative embodiments of the present invention, MTs are designed such that they have access to the up-link frequency block along with two down-link frequency blocks, hereinafter referred to as dual-band MTs, or two or more down-link frequency blocks, hereinafter referred to as multi-band MTs.

Figure 1B:
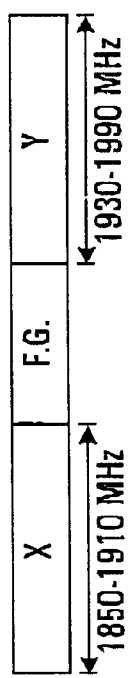
Figure 1B:
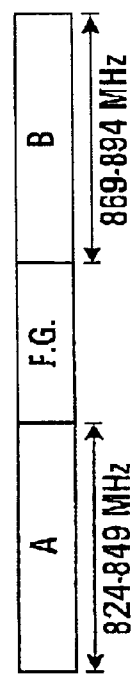
Figure 8:
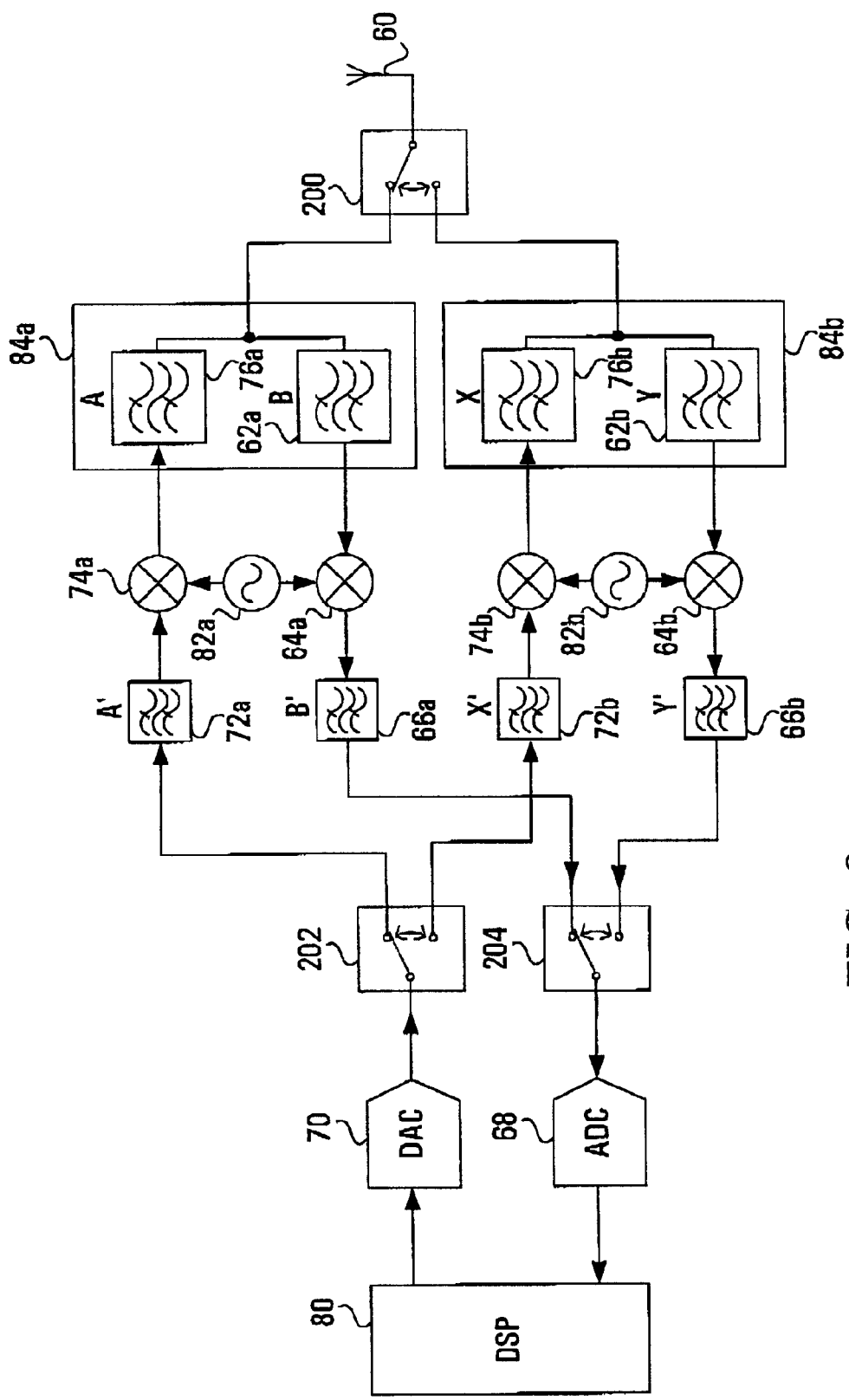
FIG. 8 is a block diagram of a well-known dual-band MT implemented within a wireless network with a frequency spectrum allocation scheme of FIG. 1B.

Before describing a sample implementation of a dual-band MT according to the present invention with reference to FIG. 9, a well-known dual-band MT is now described with reference to FIG. 8. In FIG. 8, the well-known dual-band MT is implemented within a wireless network with a frequency spectrum allocation scheme of FIG. 1B. In this case, the MT is similar to the MT of FIG. 3 but with two receive paths (one for each of the B frequency block and the Y frequency block) and two transmit paths (one for each of the A frequency block and the X frequency block). As depicted in FIG. 8, the shared components of the receive paths include the antenna 60 and the ADC 68 while the shared components for the transmit paths include the DAC 70 and the antenna 60. The remaining components of the receive paths are duplicated for the two possible down-link frequency blocks that the MT can receive from, these components including wide-band BPFs 62a,62b coupled in series with respective down-converters 64a,64b and respective narrow-band BPFs 66a,66b. Similarly, the remaining components of the transmit paths are duplicated for the two possible up-link frequency blocks that the MT can transmit to, these components including narrow-band BPFs 72a,72b coupled in series with respective up-converters 74a,74b and respective wide-band BPFs 76a,76b. Further, independent oscillators 82a, 82b are required for generating different reference frequencies for the two sets of up/down-converters.

The transition from one band to the other band within the MT of FIG. 8 is performed with the use of switches 200,202,204 that couple the shared components to the frequency band specific components. For instance, the antenna 60 is coupled via switch 200 to both of the duplexers 84a,84b comprising the wide-band BPFs 62a,72a and the wide-band BPFs 62b,72b respectively. Further, the narrow-band BPFs 66a,66b are coupled to the ADC 68 via switch 204 and the narrow-band BPFs 72a,72b are coupled to the DAC 70 via switch 202. Each of the switches 200,202,204 has two possible operating positions, one in which the corresponding shared component is coupled to the components of the A/B frequency band and one in which the corresponding shared component is coupled to the components of the X/Y frequency bands.

Figure 9:
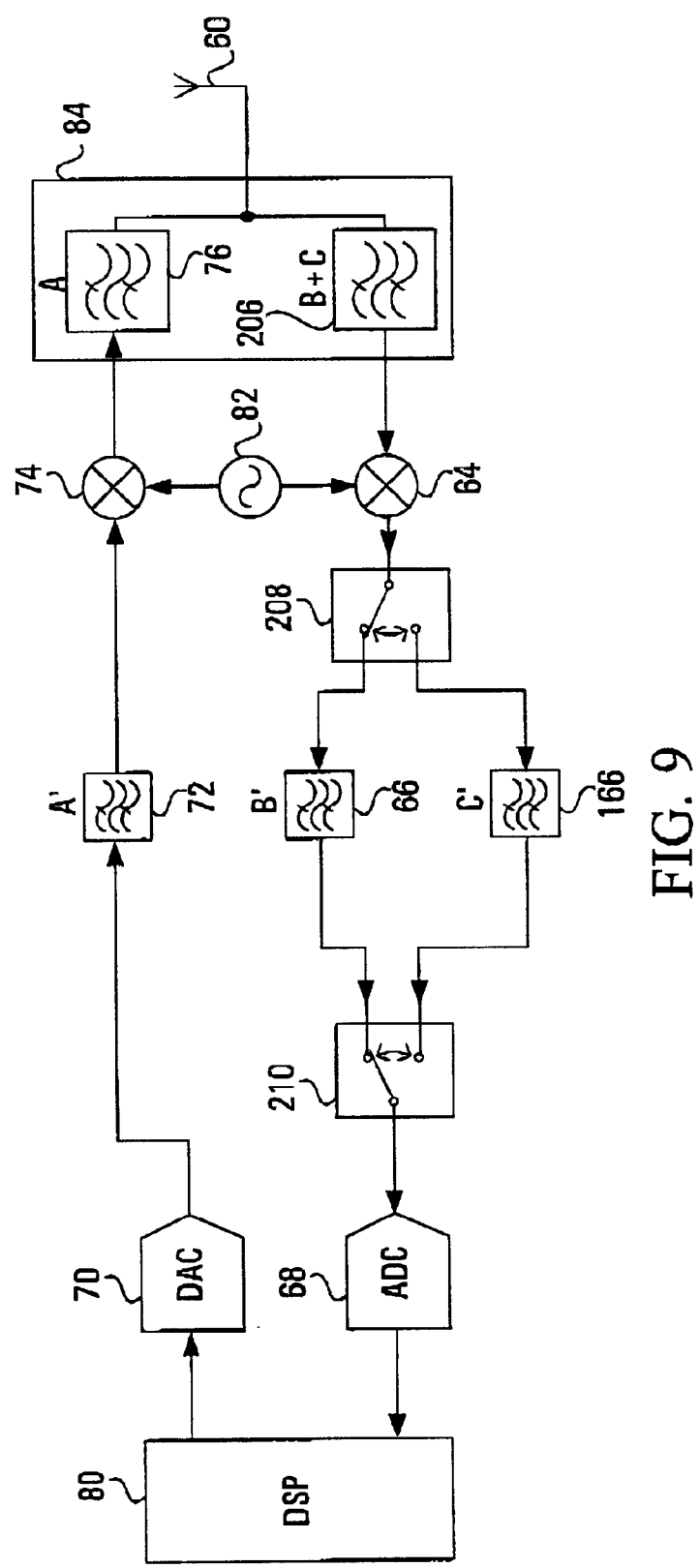
FIG. 9 is a sample block diagram of a dual-mode MT according to the present invention implemented within a wireless network with a frequency spectrum allocation scheme of FIG. 4.

FIG. 9 is a sample block diagram of a dual-mode MT according to the present invention implemented within a wireless network with a frequency spectrum allocation scheme of FIG. 4. As depicted within FIG. 9, the MT is essentially an amalgamation of the MTs of FIGS. 3 and 6. The key difference between the MT of FIG. 6 and that of FIG. 9 is the replacing of the wide-band BPF 162 with the wide-band BPF 206 that is tuned to both the B and C adjacent frequency blocks and the implementation of the narrow-band BPF 66 of FIG. 3 in parallel with the narrow-band BPF 166 of FIG. 6. In this embodiment, there are two switches that allow for the switching between the two narrow-band BPFs 66,166, one switch 208 coupled between the down-converter 64 and the narrow-band BPFs 66,166 and another switch 210 coupled between the narrow-band BPFs 66,166 and the ADC 68. With this implementation, each of the narrow-band BPFs 66,166 are tuned for a different frequency offset compared to the A frequency block. This allows the single oscillator 82 in this embodiment to be used for up-link communications in the A frequency block and down-link communications in both the B and C frequency blocks.

It should be recognized that there are numerous possible alternative embodiments to the dual-band MT of FIG. 9. These alternatives result from different components within the MT being shared. For instance, the switch 208 could be implemented directly after the wide-band BPF 206, thus forcing both narrow-band BPFs 66,166 to have a corresponding down-converter 64. In this case, the two down-converters could have the same reference frequencies input, hence requiring the predetermined frequency offset between the B and C blocks to be set by the tuning of the BPFs 66,166, or could have two different reference frequencies (from two different oscillators) input such that the predetermined frequency offset is set in the down-conversion operation, hence allowing the BPFs 66,166 to be tuned the same. In a further extension to this alternative embodiment in which the predetermined frequency offset between the B and C blocks is set within the down-conversion operation, would have the switch 210 moved between the two down-converters and a single narrow-band BPF similar to the narrow-band BPFs 66,166, but being shared between the two down-link bands.

In a yet further alternative embodiment, the switch 208 could be moved within the duplexer 84 such that it is coupled between the antenna 60 and two wide-band BPFs, one tuned to each of the B and C frequency blocks. In this case, the wide-band BPF 206 would be replaced by these two wide-band BPFs. In an even another alternative embodiment, the switch 210 could be moved directly before the DSP 80 such that the two narrow-band BPFs 66,166 would be coupled to a corresponding ADC similar to ADC 68.

In general, it can be recognized that there are numerous implementations of the dual-band MT of FIG. 9 depending on which components are shared (possibly none, though it would seem advantageous to at least share the antenna 60) and where the predetermined frequency offset is implemented (the down-conversion operation or the narrow-band BPFs). Yet further, it should be recognized that the implementation of FIG. 9 could be expanded to implementations with more than two down-link frequency blocks with the insertion of additional components that can allow the MT to switch to alternative predetermined frequency offsets related to the additional down-link frequency blocks.

It should be recognized that the switches in the implementation depicted in FIG. 9 could be of many forms such as mechanical or electrical. Further, these switches could be automatically controlled from a STS via control signals. For instance, the BTS could determine the operating frequency band for dual-band MTs like that depicted in FIG. 9 based upon the frequency band capabilities of the BTS and/or its bandwidth usage in the particular frequency bands. For instance, if one band is considered to have very limited available bandwidth, a BTS could select a MT with dual-band capabilities to operate within the frequency band (A/B band or X/Y band) that has the greater available bandwidth.

Figure 10:
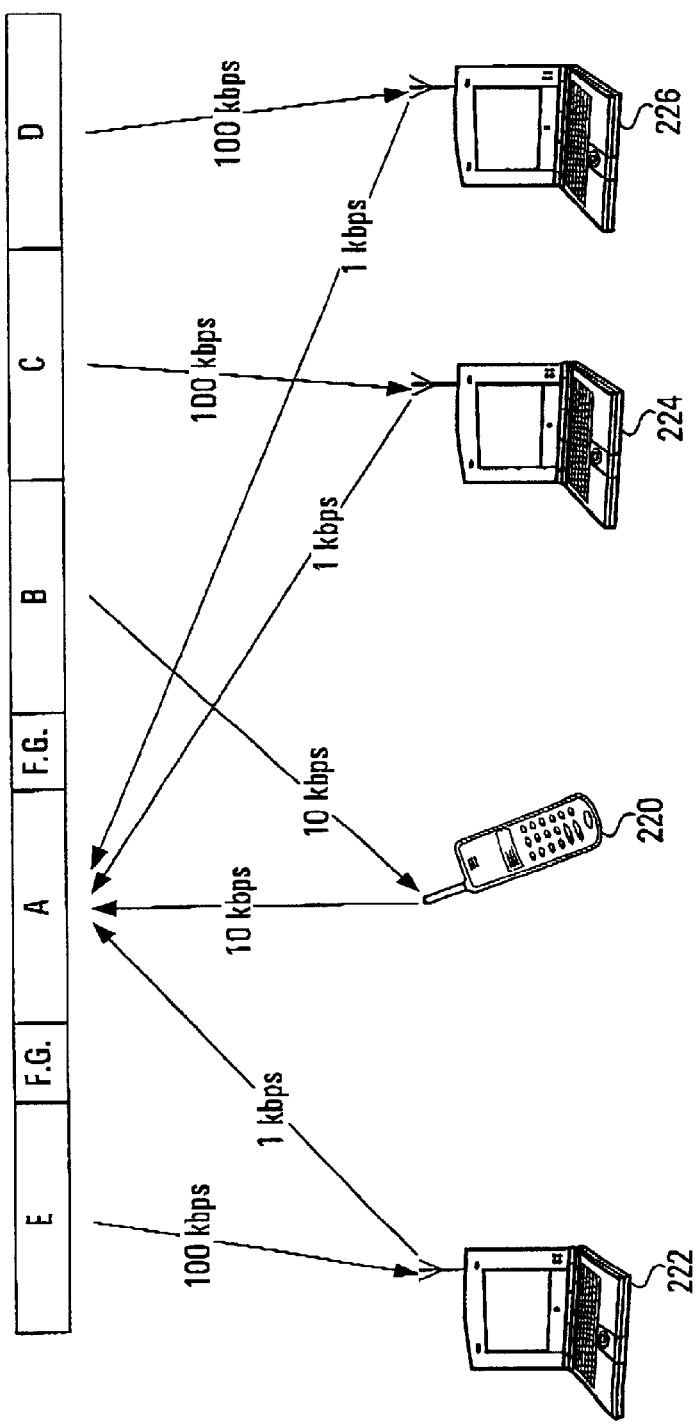
FIG. 10 is a graphical illustration of a simplified wireless network according to an embodiment of the present invention.

FIG. 10 is a graphical illustration of a simplified wireless network according to an embodiment of the present invention. In this illustration, a number of MTs 220,222,224,226 are depicted, one MT 220 being a wireless handset while the remaining MTs 222,224,226 being wireless computers. In this case, a computer can be any computing device, for example a desktop computer, Palm Pilot or clone and a wireless computer refers to any computer that has a wireless network link.

In the network of FIG. 10, there is a single up-link frequency block (A block) for four down-link frequency blocks (B, C, D and E blocks) along with a duplex separation band (indicated by an "X") on either side of the up-link frequency block. As depicted, the wireless handset 220 is communicating up-link on a frequency in the A block at 10 kbps and communicating down-link on the paired frequency in the B block at 10 kbps while the wireless computers 222,224,226 are each communicating up-link on the same A block frequency as each other and the wireless handset 220 at 1 kbps and communicating down-link on the paired frequency in the C, D and E blocks respectively at 100 kbps.

FIG. 10 represents one possible network implementation in which a plurality of NTs share a single up-link frequency block, although in reality each of the MTs of FIG. 10 would represent a large number of MTs. That is, a plurality of MTs would share each paired set of frequencies. For instance, wireless computer 222 represents a plurality of wireless computers and/or wireless handsets that all transmit up-link communications on a particular channel within the A block and receive down-link communications on a paired channel within the E block. On the other hand, wireless handset 220 represents a plurality of wireless computers and/or wireless handsets that all transmit up-link communications on the same channel within the A block and receive down-link communications on a paired channel within the B block. Wireless computers 224,226 represent correspondingly similar devices for paired channels within the C and D blocks respectively.

As well, although FIG. 10 illustrates a situation with particular bit rates for up-link and down-link communications for the wireless handset 220 and the wireless computers 222,224,226, these numbers should be considered one possible implementation while of course further bit rates could be used.

The organization of MTs, those being a combination of wireless handsets and wireless computers, within a wireless network is preferably designed in order to achieve appropriate statistical distribution of users such that no one frequency block is more overburdened than other frequency blocks. To achieve this, according to one embodiment of the present invention, a calculation is first performed to determine the expected ratio between up-link and down-link traffic within the network. In this regard, categories are established encompassing different types of traffic that have varying ratios of down-link traffic to up-link traffic. For instance, down-link:up-link ratios for voice communications, email receiving/sending over the long term, Internet surfing and ftp transfers potentially could be determined to be 1:1, 5:1, 25:1 and 125:1 respectively. With these categories' ratios, the percent of overall down-link traffic that is included in each category is statistically determined and, from this, the overall down-link:up-link ratio is calculated. For instance, if it was determined that 40% of down-link traffic is voice communications while the other 60% of down-link traffic is emailing, there would be an up-link traffic requirement of only 52% of the total down-link traffic, hence resulting in a required down-link:up-link ratio of 1.92. In another example, if it was determined that the down-link traffic was split with 20% for voice communications, 20% for emailing, 30% for Internet surfing and 30% for ftp downloading, than there would be an up-link traffic requirement of only 25% of the total down-link traffic, hence resulting in a required down-link:up-link ratio of 3.93.

Once this overall statistical ratio of down-link to up-link traffic is determined, preferably an appropriate number of down-link frequency blocks are assigned per up-link frequency block. For instance in the first example of a 1.92 ratio, two down-link frequency blocks for a single up-link frequency block would be appropriate while in the second example of a 3.93 ratio, four down-link blocks are appropriate. One would understand that the assignment of up-link and down-link frequency blocks at this level are generally regulated by governments and, thus the ideal ratio of down-link to up-link frequency blocks for a particular company may not be possible.

It should be understood that once a company has acquired a particular number of down-link blocks per up-link block, system deployment will need to include an assessment of asymmetrical traffic demand and impacts on the system in order to distribute users appropriately.

In the network implementation of FIG. 10, the wireless handsets 220 operate as A/B MTs while the wireless computers operate as one of A/C, A/D and A/E MTs. In this embodiment, if, as shown in FIG. 10, a wireless handset utilizes 10 kbps of up-link bandwidth and 10 kbps of down-link bandwidth while a wireless computer utilizes on average 1 kbps of up-link bandwidth and 100 kbps of down-link bandwidth, then 10 wireless computers creates equivalent up-link traffic to a single wireless handset within the A frequency block. This means that for every 10 wireless computers, a single wireless handset cannot utilize the A block for up-link communications Therefore, if the B block is exclusively used by wireless handsets (thus allowing current wireless handset networks to remain compatible to the new network architecture), not all of the bandwidth within the B frequency block will be utilized since not all of the A block will be available for wireless handset communications. This problem can be rectified by allowing some wireless computers to utilize the remaining statistical bandwidth within the B frequency block. This can be done by selling some A/B wireless computers or by selling some multi-band wireless computers that include the B frequency block as one of its down-link blocks.

Further, one would understand, as discussed previously, that any one or more of the MTs within FIG. 10 could be a multi-band MT and hence could allow the BTS to adjust the down-link frequency blocks for these MTs. By adjusting the down-link frequency blocks for some MTs, the BTS can reduce the situations in which available bandwidth becomes critical or is inefficiently used.

As well, with the use of a multi-band MT, it could be possible that a MT operating very high capacity applications could simultaneously use a plurality of down-link channels corresponding to a plurality of down-link blocks. Essentially, a MT in this embodiment is utilizing a plurality of the paired channels for a single application.

Yet further, it should be recognized that additional separation bands could be implemented between frequency blocks of FIG. 10. Even further, frequency blocks do not generally have to be adjacent to one another, but one or more of the frequency blocks could be isolated from the other blocks, thus simply creating a larger frequency offset between it and the other frequency blocks.

One key advantage of the implementation of the present invention is the ability to adjust the down-link bandwidth to up-link bandwidth ratio from the standard symmetrical implementation. This ability can result in a significant increase in usage efficiency for the frequency spectrum. With the increasingly skewed down-link to up-link ratios caused by increasing wireless data traffic, the utilization efficiency of the up-link frequency block(s) (sub-blocks) increase significantly with users sharing them between down-link frequency blocks (sub-blocks).

One disadvantage of the present invention could occur if significant up-link bandwidth is required for such things as up-loading data to a server from a MT. In this case, this large up-link traffic could result in a large monopolization of up-link bandwidth that could cause considerable blocking and/or slowing of voice/data sessions. One solution to this problem is simply to limit the up-link bandwidth provided to any user in times of critical up-link bandwidth, thus resulting in a slower uploading of data for this user but no significant side affects to the wireless networks as a whole.

It is noted that the above description of the present invention is not specific to any particular wireless standard and could be applied to numerous well-known multiplexing standards such as CDMA and TDMA. In fact, in some alternative embodiments of the present invention it is possible to use different standards for up-link and down-link communications and/or different standards for different down-link blocks as long as the shared up-link channel is compatible.

It is further noted that although, as described herein above, the up-link frequency block is the same size as each of the down-link frequency blocks, this is not meant to limit the scope of the present invention in its broadest aspect. In alternative embodiments of the present invention, the up-link block and at least one down-link are of different frequency sizes. For one, using different multiplexing standards as discussed above, different block sizes may be necessary. Further, using non-uniform frequency offsets between paired up-link/down-link channels can allow for different sized up-link/down-link frequency blocks. For example, in this alternative, one MT could utilize the first channel within the A block for up-link communications and the fifth channel within the B block for down-link communications while a second MT could utilize the first channel within the A block for up-link communications and the fourth channel within the B block for down-link communications while a third MT could utilize the first channel within the A block for up-link communications and the fourth channel within the C block for down-link communications.

Figure 11A:
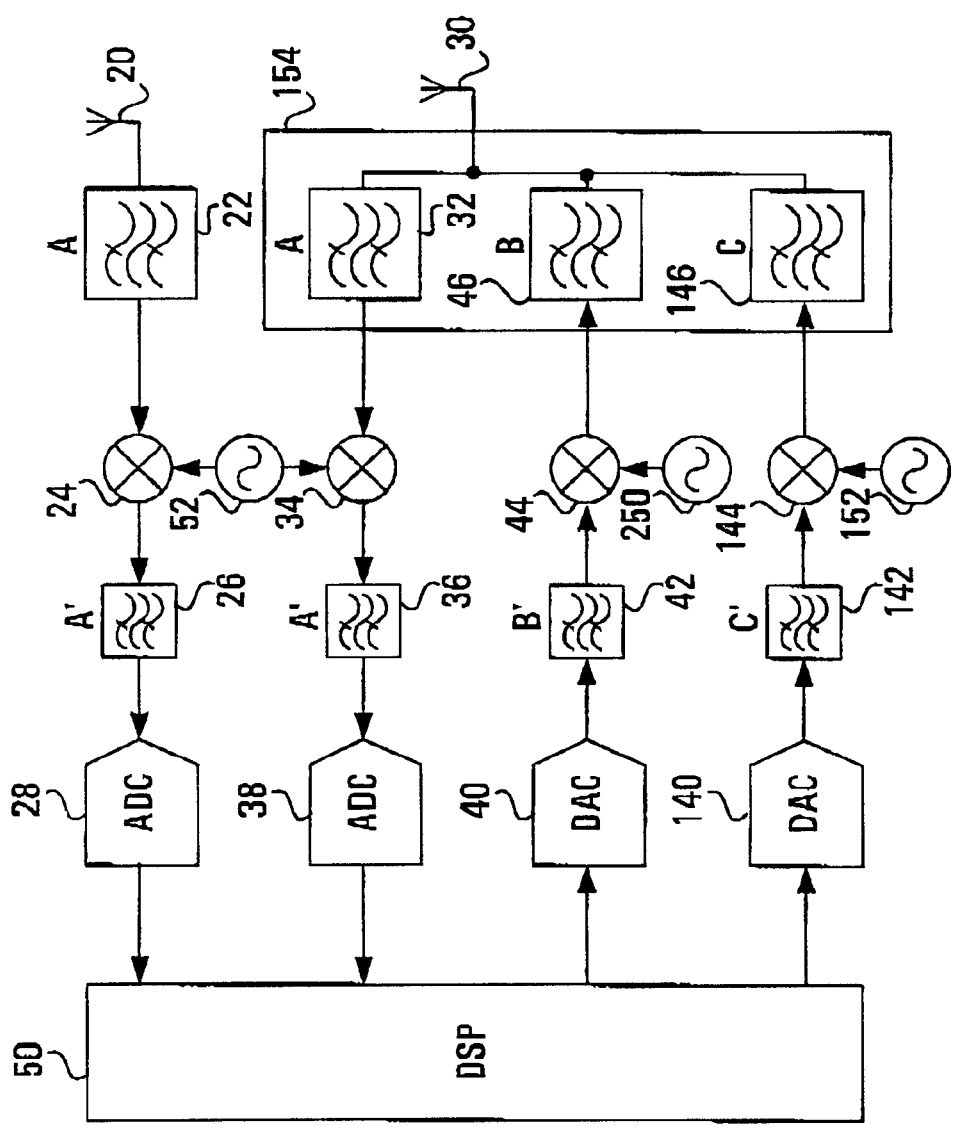
FIGS. 11A and 11B are block diagrams of a BTS and a MT respectively according to alternative embodiments of the present invention.
Figure 11B:
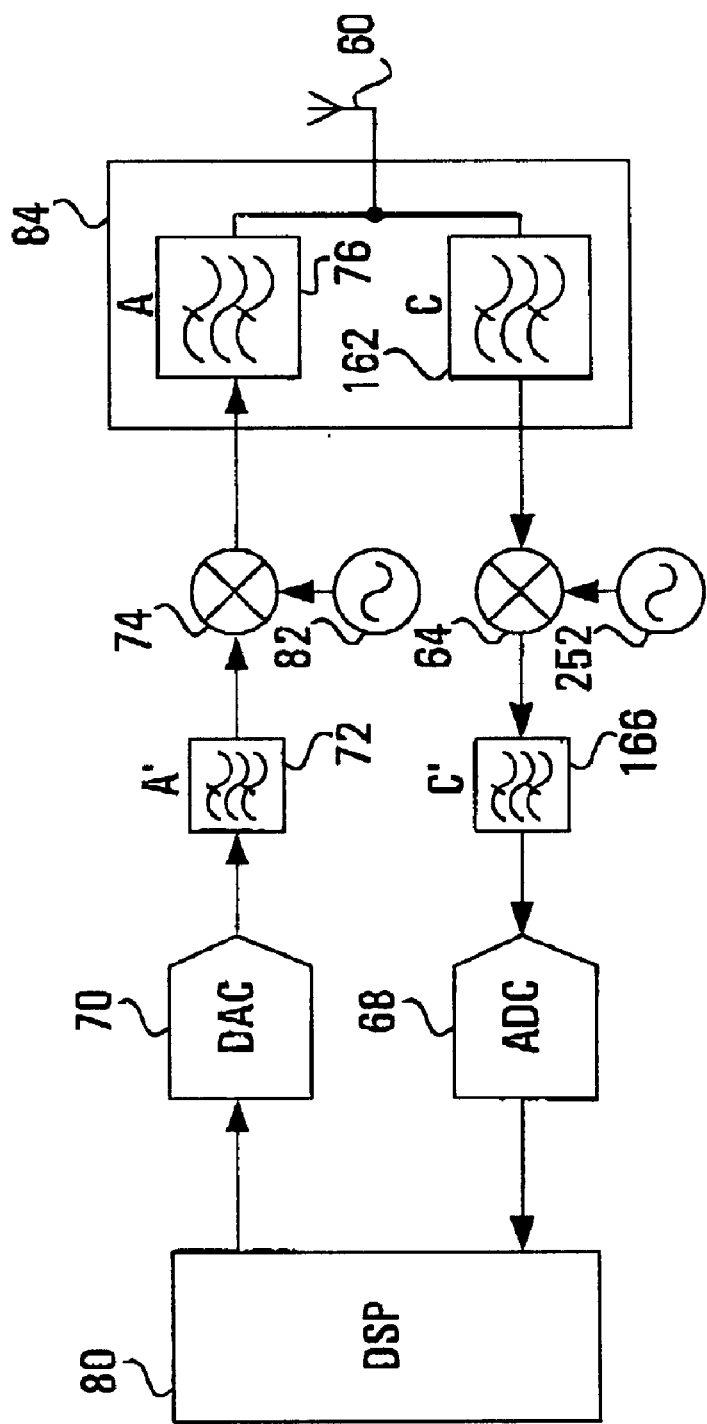

The key problem with using non-uniform frequency offsets between up-link and down-link communications is the increased complexity that this causes since the BTS and MTs must be able to tune to the particular frequencies of the up-link channel that they are assigned and tune to the particular frequency of the down-link channel that they are assigned. This modification requires the up-link and down-link communication paths within both the BTS and the MTs to have separate oscillators. For instance, as illustrated within FIG. 11A, a BTS similar to FIG. 5 is depicted with the first up-converter 44 being coupled to an additional oscillator 250 rather than oscillator 52 as shown in FIG. 5. This allows the frequency offset between the channels the first transmit path and the receive path are tuned to be modified based upon the relative frequencies of the oscillators 52,250. The frequency offset between the channels in which the second transmit path and the receive path are tuned can already be modified due to the second up-converter 144 having a separate oscillator 152 coupled to it in both FIGS. 5 and 11A. Further, looking at FIG. 11B, with the addition of separate oscillator 252 being coupled to the down-converter 64 rather than the sharing of an oscillator 82 depicted in FIG. 6, the frequency offset between the channels in which the transmit and receive paths are tuned can be adjusted.

One advantage of the alternative embodiment with non-uniform frequency offsets is the fact that in it is possible to attain relatively efficient asymmetrical communications without necessarily adding additional blocks of spectrum. Instead the down-link block(s) currently implemented could simply be increased in size. The disadvantage of this alternative embodiment, as described above, is the increased complexity within both the BTS and the MTs that is necessary.

Persons skilled in the art will appreciate that there are yet more alternative implementations and modifications possible for implementing the present invention, and that the above implementations are only illustrations of certain embodiments of the invention. The scope of the invention, therefore, is only to be limited by the claims appended hereto.

We claim:

1. A Base Transceiver Station (BTS) arranged to be implemented within a wireless network, the BTS comprising:

one or more antennas;
at least one receive apparatus, coupled to the one or more antennas, that operates to receive uplink signals from a plurality of mobile terminals within the wireless network via a channel within a first frequency block;
a first transmit apparatus, coupled to the one or more antennas, that operates to transmit downlink signals to a first set of the plurality of mobile terminals via a channel within a second frequency block; and
a second transmit apparatus, coupled to the one or more antennas, that operates to transmit downlink signals to a second set of the plurality of mobile terminals via a channel within a third frequency block, the third frequency block being different from the second frequency block;
wherein a combined bandwidth size of the second and third frequency blocks is greater than a bandwidth size of the first frequency block.

2. A BTS according to claim 1, wherein the channels within the first and second frequency blocks have a first predetermined frequency offset and the channels within the first and third frequency blocks have a second predetermined frequency offset.

3. A BTS according to claim 2, wherein the receive apparatus comprises a first wide-band BandPass Filter (BPF) coupled in series with a down-converter and a first narrow-band BPF; the first transmit apparatus comprises a second narrow-band BPF coupled in series with a first up-converter and a second wide-band BPF; and the second transmit apparatus comprises a third narrow-band BPF coupled in series with a second up-converter and a third wide-band BPF; and wherein the first, second and third wide-band BPFs are each coupled to one of the one or more antennas.

4. A BTS according to claim 3, wherein the first predetermined frequency offset is set by the relative frequency tuning between the first and second narrow-band BPFs.

5. A BTS according to claim 4, wherein the second predetermined frequency offset is set by the relative frequency tuning between the first and third narrow-band BPFs.

6. A BTS according to claim 5, wherein each of the up-converter, the first down-converter and the second down-convener receive a single reference oscillation signal that controls their frequency conversion.

7. A BTS according to claim 4, wherein the up-converter and the first down-converter receive a first reference oscillation signal that controls their frequency conversion and the second down-converter receives a second reference oscillation signal that controls its frequency conversion; and wherein the second predetermined frequency offset is set by the relative frequency difference between the first and second reference oscillation signals.

8. A BTS according to claim 3, wherein the up-converter, the first down-converter and the second down-converter receive respective first, second and third reference oscillation signals that control their frequency conversions; and wherein the first predetermined frequency offset is set by the relative frequency difference between the first and second reference oscillation signals and the second predetermined frequency offset is set by the relative frequency difference between the first and third reference oscillation signals.

9. A BTS according to claim 1, wherein the receive apparatus comprises a first wide-band BandPass Filter (BPF) coupled in series with a down-converter and a first narrow-band BPF; the first transmit apparatus comprises a second narrow-band BPF coupled in series with a first up-converter and a second wide-band BPF; and the second transmit apparatus comprises a third narrow-band BPF coupled in series with a second up-converter and a third wide-band BPF; and wherein the first, second and third wide-band BPFs are each coupled to one of the one or more antennas.

10. A BTS according to claim 9, wherein the up-converter, the first down-converter and the second down-converter receive respective first, second and third reference oscillation signals that control their frequency conversions; and wherein a first frequency offset between the channels within the first and second frequency blocks is set by the relative frequency difference between the first and second reference oscillation signals and a second frequency offset between the channels within the first and third frequency blocks is set by the relative frequency difference between the first and third reference oscillation signals.

11. A BTS according to claim 9, wherein the first, second and third wide-band BPFs are tuned to frequency bands within the first, second and third frequency blocks respectively.

12. A BTS according to claim 9, wherein the first wide-band BPF and at least one of the second and third wide-band BPF together comprise a duplexer.

13. A BTS according to claim 9 further comprising a Digital Signal Processor (DSP);

wherein the receive apparatus further comprises an Analog to Digital Converter (ADC) coupled between the first narrow-band BPF and the DSP, the first transmit apparatus further comprises a first Digital to Analog Converter (DAC) coupled between the DSP and the second narrow-band BPF, and the second transmit apparatus further comprises a DAC coupled between the DSP and the third narrow-band BPF.

14. A BTS according to claim 1, wherein the receive apparatus and the first and second transmit apparatus are each coupled to the same one of the antennas.

15. A BTS according to claim 14, wherein the receive apparatus and the first transmit apparatus are each coupled to the same one of the one of the antennas and the second transmit apparatus is coupled to another one of the antennas.

16. A BTS according to claim 1, wherein each of the transmit apparatus and the first and second transmit apparatus are coupled to a different one of the antennas.

17. A BTS according to claim 1, wherein the at least one receive apparatus comprises a plurality of receive apparatus coupled to one of the one or more antennas, each of the receive apparatus being arranged to receive uplink signals from the plurality of mobile terminals via the channel within the first frequency block.

18. A wireless network comprising:
a plurality of mobile stations; and
a Base Transceiver Station (BTS) that operates to:
receive uplink signals from each of the mobile terminals via a channel within a first frequency block;
transmit downlink signals to a first set of the plurality of mobile terminals via a channel within a second frequency block; and
transmit downlink signals to a second set of the plurality of mobile terminals via a channel within a third frequency block, the third frequency block being different from the second frequency block;
wherein a combined bandwidth size of the second and third frequency blocks is greater than a bandwidth size of the first frequency block.

19. A network according to claim 18, wherein the channels within the first and second frequency blocks have a first predetermined frequency offset and the channels within the first and third frequency blocks have a second predetermined frequency offset.

20. A method for utilizing frequency spectrum within a wireless network, the method comprising:
receiving uplink signals from each of a plurality of mobile terminals via a channel within a first frequency block;
transmitting downlink signals to a first set of the plurality of mobile terminals via a channel within a second frequency block; and
transmitting downlink signals to a second set of the plurality of mobile terminals via a channel within a third frequency block, the third frequency block being different from the second frequency block;
wherein a combined bandwidth size of the second and third frequency blocks is greater than a bandwidth size of the first frequency block.

21. A mobile terminal (MT) arranged to be implemented within a wireless network, the mobile terminal comprising:
an antenna;
a transmit apparatus, coupled to the antenna, arranged to transmit uplink signals to a Base Transceiver Station (BTS) within the wireless network via a channel within a first frequency block; and
a plurality of receive apparatus, each coupled to the antenna, arranged to receive downlink signals from the BTS via channels within a plurality of other corresponding frequency blocks;
wherein a combined bandwidth size of the plurality of other corresponding frequency blocks is greater than a bandwidth size of the first frequency block.

22. A MT according to claim 21, wherein the channels within the first frequency block and each of the plurality of other frequency blocks have corresponding predetermined frequency offsets.

23. A MT according to claim 22, wherein the transmit apparatus comprises a first wide-band BandPass Filter (BPF) coupled to the antenna and further coupled in series with an up-converter and a first narrow-band BPF; and the plurality of receive apparatus each comprise a second narrow-band BPF coupled in series with a down-converter and a second wide-band BPF that is further coupled to the antenna.

24. A MT according to claim 23, wherein the predetermined frequency offsets are set by the relative frequency tuning between the first narrow-band BPF and each of the second narrow-band BPFs.

25. A MT according to claim 24, wherein the up-converter and each of the down-converters receive a single reference oscillation signal that controls their frequency conversion.

26. A MT according to claim 24, wherein at least one of the down-converter within each of the plurality of receive apparatus is the same device and the wide-band BPF within each of the plurality of receive apparatus is the same device.

27. A MT according to claim 23, wherein the up-converter receives a first reference oscillation signal that controls its frequency conversion and each of the down-converters receives respective second reference oscillation signals that control their frequency conversions; and wherein the predetermined frequency offsets are set by the relative frequency differences between the reference oscillation signals and each of the second reference oscillation signals.

28. A MT according to claim 27, wherein at least one of the narrow-band BPF within each of the plurality of receive apparatus is the same device and the wide-band BPF within each of the plurality of receive apparatus is the same device.

29. A MT according to claim 28, wherein the first wide-band BPF and at least one of the second wide-band BPFs together comprise a duplexer.

30. A MT according to claim 28 further comprising a Digital Signal Processor (DSP);

wherein the transmit apparatus further comprises a Digital to Analog Converter (DAC) coupled between the DSP and the first narrow-band BPF and each of the receive apparatus further comprises an Analog to Digital Converter (ADC) coupled between each of the second narrow-band BPFs and the DSP.

31. A MT according to claim 30, wherein the DAC within each of the plurality of receive apparatus is the same device.

32. A MT according to claim 21, wherein the transmit apparatus comprises a first wide-band BandPass Filter (BPF) coupled to the antenna and further coupled in series with an up-converter and a first narrow-band BPF; and the plurality of receive apparatus each comprise a second narrow-band BPF coupled in series with a down converter and a second wide-band BPF that is further coupled to the antenna.

33. A MT according to claim 32, wherein the up-converter receives a first reference oscillation signal that control its frequency conversions and each of the down-converters receive respective second reference oscillation signals that control their frequency conversions; and wherein frequency offsets between the channels within the first frequency block and each of the plurality of other frequency blocks are set by the relative frequency differences between the first reference oscillation signal and each of the second frequency oscillation signals.

34. A MT according to claim 21 further comprising at least one switching device that activates only a single one of the receive apparatus at any one time.

35. A MT according to claim 21, wherein two or more of the receive apparatus are operable together.

36. A Base Transceiver Station (BTS) arranged to be implemented within a wireless network, the BTS comprising:

means for receiving uplink signals from a plurality of mobile terminals within the wireless network via a channel within a first frequency block; and means for transmitting downlink signals to a first set of the plurality of mobile terminals via a channel within a second frequency block and transmitting downlink signals to a second set of the plurality of mobile terminals via a channel within a third frequency block, the third frequency block being different from the second frequency block;

wherein a combined bandwidth size of the second and third frequency blocks is greater than a bandwidth size of the first frequency block.

37. A mobile terminal arranged to be implemented within a wireless network, the mobile terminal comprising:

means for transmitting uplink signals to a Base Transceiver Station (BTS) within the wireless network via a channel within a first frequency block; and means for receiving downlink signals from the BTS via channels within a plurality of other corresponding frequency blocks;

wherein a combined bandwidth size of the plurality of other corresponding frequency blocks is greater than a bandwidth size of the first frequency block.

38. A Base Transceiver Station (BTS) arranged to be implemented within a wireless network, the BTS comprising:

one or more antennas;

at least one receive apparatus coupled to the one or more antennas, that operates to receive uplink signals from a plurality of mobile terminals within the wireless network via a channel within a first frequency block; and at least one transmit apparatus, coupled to the one or more antennas, that operates to transmit downlink signals to a first set of the plurality of mobile terminals via a channel within a second frequency block;

wherein a frequency offset between the channels within the first and second frequency blocks is dynamically controlled;

wherein the receive apparatus comprises a first wide-band BandPass Filter (BPF) coupled in series with a down-converter and a first narrow-band BPF and the transmit apparatus comprises a second narrow-band BPF coupled in series with a first up-converter and a second wide-band BPF;

wherein the first and second wide-band BPFs are each coupled to one of the one or more antennas;

wherein the up-converter and the down-converter receive respective first and second reference oscillation signals that control their frequency conversions; and wherein the frequency offset between the channels within the first and second frequency blocks is set by the relative frequency difference between the first and second reference oscillation signals.

39. A mobile terminal (MT) arranged to be implemented within a wireless network, the mobile terminal comprising:

an antenna;

a transmit apparatus, coupled to the antenna, arranged to transmit uplink signals to a Base Transceiver Station (BTS) within the wireless network via a channel within a first frequency block; and a receive apparatus, coupled to the antenna, arranged to receive downlink signals from the BTS via a channel within a second frequency block;

wherein a frequency offset between the channels within the first and second frequency blocks is dynamically controlled.

40. A MT according to claim 39, wherein the transmit apparatus comprises a first wide-band BandPass Filter (BPF) coupled to the antenna and further coupled in series with an up-converter and a first narrow-band BPF; and the plurality of receive apparatus each comprise a second narrow-band BPF coupled in series with a down-converter and a second wide-band BPF that is further coupled to the antenna;

wherein the down-converter and the up-converter receive respective first and second reference oscillation signals that control their frequency conversions; and wherein the frequency offset between the channels within the first and second frequency blocks is set by the relative frequency difference between the first and second reference oscillation signals.

* * * * *

UNITED STATES PATENT AND TRADEMARK OFFICE
CERTIFICATE OF CORRECTION

PATENT NO. : 6,731,953 B1  
DATED : May 4, 2004  
INVENTOR(S) : Neil McGowan et al.

It is certified that error appears in the above-identified patent and that said Letters Patent is hereby corrected as shown below:

Column 16,
Line 58, "convener" should be -- converter --.

Signed and Sealed this

Twenty-third Day of November, 2004

JON W. DUDAS
*Director of the United States Patent and Trademark Office*